US 8,856,367 B2

(12) United States Patent
Steindl

(10) Patent No.: US 8,856,367 B2
(45) Date of Patent: Oct. 7, 2014

(54) ARRANGEMENT AND METHOD FOR INTERCHANGING TIME MARKERS

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 61 days.

(21) Appl. No.: 13/303,478

(22) Filed: Nov. 23, 2011

(65) Prior Publication Data

US 2012/0137013 A1     May 31, 2012

(30) Foreign Application Priority Data

Nov. 26, 2010   (EP) ................................. 10192774

(51) Int. Cl.
*G06F 15/16*       (2006.01)
*H04J 3/06*        (2006.01)

(52) U.S. Cl.
CPC ............ *H04J 3/0673* (2013.01); *H04J 3/0667* (2013.01)
USPC ....................................... 709/230

(58) Field of Classification Search
None
See application file for complete search history.

(56) References Cited

U.S. PATENT DOCUMENTS

| 6,625,751 | B1 | 9/2003 | Starovic et al. | |
|---|---|---|---|---|
| 7,835,402 | B2 * | 11/2010 | Erich et al. | 370/503 |
| 8,175,089 | B2 * | 5/2012 | Hall et al. | 370/389 |
| 8,260,948 | B2 * | 9/2012 | Chand et al. | 709/231 |
| 8,515,069 | B2 * | 8/2013 | Kuo et al. | 380/260 |
| 2003/0126498 | A1 | 7/2003 | Bigbee et al. | |
| 2007/0186010 | A1 * | 8/2007 | Hall et al. | 709/246 |
| 2007/0226317 | A1 * | 9/2007 | Rydberg et al. | 709/218 |
| 2007/0226318 | A1 * | 9/2007 | Rydberg et al. | 709/218 |
| 2009/0007129 | A1 * | 1/2009 | Solimano | 718/104 |
| 2009/0109954 | A1 | 4/2009 | Laulainen et al. | |
| 2010/0058335 | A1 | 3/2010 | Weber | |
| 2010/0121951 | A1 * | 5/2010 | Trebing et al. | 709/224 |

FOREIGN PATENT DOCUMENTS

CN          101420281 A     4/2009

OTHER PUBLICATIONS

Paolo Ferrari, Alessandra Flammini, Stefano Rinaldi, and Emiliano Sisinni, "On the Seamless Interconnection of IEEE1588—Based Devices Using a Profinet IO Infrastructure", IEEE Transactions on Industrial Informatics, vol. 6, No. 3, Aug. 2010.*
IEEE Standard for a Precision Clock Synchronization Protocol for Networked Measurement and Control Systems, IEEE Instrumentation and Measurement Society, IEEE Std 1588™-2008.*

(Continued)

*Primary Examiner* — Ninos Donabed
(74) *Attorney, Agent, or Firm* — Cozen O'Connor

(57) ABSTRACT

An arrangement and a method for interchanging time markers between a first and a second network, wherein the time markers each comprise data packets having a payload comprising a coded time information item. A device is configured to receive a first time marker, directly remove the coded time information item, insert the coded time information item into a new data packet from the second protocol, and to send this data packet as a second time marker using the second network. The arrangement and method allow closed control of the time information or the clock of the time accepter across a network boundary.

5 Claims, 5 Drawing Sheets

(56) References Cited

OTHER PUBLICATIONS

Sebastian Schriegel, Juergen Jaspemeite, Investigation of Industrial Environmental Influences on Clock Sources and their Effect on the Synchronization Accuracy of IEEE 1588, 2007 International IEEE Symposium on Precision Clock Synchronization (ISPCS) for Measurement, Control and Communication Vienna, Austria, Oct. 1-3, 2007.*

Ferrari, Paolo et al; "On the Seamless Interconnection of IEEE 1588—Based Devices Using a Profinet IO Infrascture"; IEEE Transactions On Industrial Informatics, vol. 6, No. 3, Aug. 2010; pp. 381-392; 2010.

* cited by examiner

ARRANGEMENT AND METHOD FOR INTERCHANGING TIME MARKERS

BACKGROUND OF THE INVENTION

1. Field of the Invention

The invention relates to data communications and, more particularly, to an arrangement having a device for interchanging time markers between a time generator and a time receiver, and to a method for interchanging time markers between a first and a second network.

2. Description of the Related Art

In many areas of engineering, it is necessary to precisely synchronize time information, such as the time of day, which is present in different technical appliances. In the case of appliances and components that are connected to one another by a data network, the synchronization is achieved by interchanging special messages comprising time markers, "time stamp messages" or "synchronization messages". Depending on the technology or the communication protocol that is used, different standardized protocols are used for the time markers. For example, in standard network engineering for office communication, which is based on Ethernet cabling and interchanges data in accordance with the TCP/IP protocol, the protocol PTPv2 Precision Time Protocol (PTP) standardized based on Institute of Electrical and Electronic Engineers (IEEE) Standard 1588 or gPTP based on the IEEE standard 802.1 AS is used for the time markers, whereas in the Profinet networks customarily used for automation engineering and process control engineering, e.g., Profinet IO, the method Precision Transparent Clock Protocol (PTCP) standardized based on the International Electrotechnical Commission (IEC) Standard 61158 Type 10 is used.

Besides the aforementioned time markers, which are transmitted from a time generator (i.e., a "master", "time master" or "time server") to a time acceptor (i.e., a "time receiver", "client" or "time slave"), additional use is made of messages that are used to ascertain and communicate the propagation time (i.e., line delay) of the synchronization messages (i.e., time markers), such as "DelayRequest frames" and "DeleyResponse frames". Besides the time markers, such messages interchanged between time generator and time acceptor will subsequently be referred to generally as "correction messages". In order to determine the propagation time of the synchronization message or time marker, all subsystems are measured and taken into account to evaluate the synchronization message on the receiver. So that the receiver does not require information about the whole transmission link (i.e., all subsystems), the delays are either accumulated in a dedicated field in the synchronization message or transmitted in accumulated form in a dedicated message (i.e., follow-up). Hence, the time markers and the correction messages (e.g., DelayRequest frames), which are also sent "in the opposite direction", correct the signal propagation time. Consequently, synchronization between a time generator and a time acceptor can be performed in a network with a high level of precision.

In addition, a controlled system is closed by the "regular" reception of a (new) synchronization message or time marker (i.e., "Follow-up frames") and by the measurement, which is thereby possible, of the "drift" or "clock deviation" in the SyncSlave, i.e., the time receiver. The manipulated variable that is used is the frequency of the "clock" in the time receiver (i.e., faster/slower), where the frequency is adjusted (i.e., corrected) using a first factor ("Rate Compensation Factor" (RCF)). A further factor, i.e., the "Offset Compensation Factor" (OCF), is used to compensate for previously accrued deviations by additionally speeding up or slowing down the clock generator or time generator in the receiver. This compensation involves correction of the deviation that occurs as a result of the "drift" in a receiver crystal or the like in the receiver in the period between the reception of two time markers. The entire compensation thus does not occur abruptly, but rather the time information from the receiver approaches the target value ideally steadily. However, only the propagation time delays (i.e., line delays) are taken into account not by adjusting the clock using the factors (RCF, OCF) in the receiver, but rather by adding the total delay in the receiver. By limiting the factors (RCF, OCF), the adjustment of the receiver "clock" is distributed over an adjustment period. This adjustment corresponds to damping the controller response.

In automation engineering and also in other areas of engineering, it is customary to link data networks using different technologies or with different communication protocols to one another. Here, the interfaces of the two networks usually have devices known as "gateways" used on them that convert messages from a first to a second communication protocol, and from a second to a first communication protocol. In order to interchange time markers across the boundaries of a network, it is a known practice to equip a gateway with a "boundary clock" comprising, in principle, a time acceptor and a time generator linked thereto. Here, two synchronization domains are thus linked to one another in one appliance using a "SyncSlave" and a "SyncMaster".

The time acceptor synchronizes itself to the time generator of the sending network, where the time acceptor receives the time markers from the time generator in the first network and also interchanges correction messages with the time generator. As a result, the propagation time delay of the first network can be taken into account. To this end, the time markers carry a separate "Delay" data field in which the propagation time delays of all previously transited subsystems are accumulated. The time information coded therein is then removed from the received time markers, and the precise time information is extracted therefrom and transferred to a further time generator, which likewise forms part of the "boundary clock". The further time generator then produces time markers for the second network protocol, recodes the time information and inserts time markers into time information and sends it to the receiver (i.e., the time acceptor) in the second network, where the receiver in turn interchanges correction messages with this second time generator. As a result, it is also possible to measure the propagation time delays of the second network and take them into account in addition to the propagation time delays of the first network. In the case of the time acceptor (i.e., the SyncSlave), the "Delay" value is added to the decoded time information.

The time acceptor and the time generator for the "boundary clock", which are likewise two independently operated but coupled "clocks" may likewise be a controlled system in which the time acceptor is tracked to the time generator. As a result, it is also possible or necessary for adjustments to be made by factors (RCF, OCF) in this case. In addition, it is also possible for a delay value to be ascertained within the "boundary clock" and to be added to the relevant data field of the time markers.

The use of the known "boundary clocks" thus allows two appliances or components which are arranged in different networks with different protocols for the time markers to be synchronized to one another. However, the use of "boundary clocks" also has associated disadvantages. The fact that, in principle, two applications need to be linked to one another, i.e., a time acceptor and a time generator (also an "application gateway") means that firstly the time information is in the "boundary clock" for a relatively long residence time, and hence deviations arise as a result of the "drift" in the non-ideal clock generators of the network components involved in transmitting the time markers, where the deviation also increase as the "age" of the time information increases. While this deviation is insignificant in many applications and in many network topologies, it may arise, however, that a multiplicity of networks are linked or concatenated to one another. Consequently, multiple application gateways are necessary for the time markers.

The total propagation time of a time marker and hence the "age" of the time information thus increase with every gateway between networks and, hence, with the number of "boundary clocks" transited. Secondly, an arrangement comprising two networks and a "boundary clock" is a cascaded "control system" comprising at least two control loops, i.e., one in each of the two linked networks. Usually, a third control loop is also included within the "boundary clock". When control loops are concatenated, the compensating factors can become greater with every control stage that is traversed. However, because large or even abrupt alterations in the time information are undesirable in the (ultimate) time receiver (steadiness requirement), the entire system needs to be operated with a relatively high level of damping. Consequently, the risk of oscillations in the "output signal" (i.e., the time information) increases with the number of traversed subsystems (networks) and "boundary clocks". This situation is countered by potentially slower correction of the time signal on the time receiver to the "master signal", which results in a slower and poorer correction response, however.

SUMMARY OF THE INVENTION

It is therefore an object of the present invention to improve the synchronization between a time generator and a time receiver in different networks, particularly in the case of arrangements having multiple network gateways.

This and other objects and advantages are achieved in accordance with the invention by providing an arrangement having a device for interchanging time markers between a time generator in a first network and a time receiver in a second network, where the first network contains a first protocol and the second network contains a different second protocol for the time markers, and where the time markers each comprise data packets having a payload comprising a coded time information item. In accordance with the invention, the device is set up to receive a first time marker using the first network and to directly remove the coded time information. The coded time information is inserted into a new data packet of the second protocol and the new data packet is sent to the time receiver using the second network. Such an arrangement firstly allows fast transmission of the time information across a network boundary. As a result, it is possible to reduce a "drift" that is dependent on the conversion period. Secondly, the arrangement allows closed control of the delays across one or all network boundaries which makes it possible to avoid the disadvantages of cascaded control, i.e., it allows an improvement in the oscillation response, a reduction in the total damping required and hence faster locking onto the target values.

The object is also achieved by a method for interchanging time markers between a first and a second network, where the first network involves the use of a first protocol and the second network involves the use of a different second protocol for the time markers. In addition, the time markers each have data packets having a payload comprising a coded time information item. In accordance with the method of the invention, a first time marker is initially received using the first network. The coded time information is then extracted from the received data packet. A data packet is subsequently produced in accordance with the second protocol, where the payload added to the data packet comprises the coded time information that is removed from the first data packet. The second data packet is then transmitted to at least one receiver as a time marker using the second network. The method in accordance with the invention allows realization of the above-described advantages explained in connection with the arrangement in according with the invention.

The solution to the problem is based on the insight that although the data packets that are used for the time markers of the different protocols differ in terms of the "headers" and other network-specific protocol information, they almost do not differ at all in terms of the coding of the useful content, i.e., the time information. As a result, transfer of the time information from time markers of the first protocol to time markers of the second protocol is possible without needing to decode and then recode the time information, i.e., without an application gateway. This firstly allows shortening of the "residence time" for the time information in the gateway between the networks. A further essential concept of the invention is secondly the insight that better compensation for the drift and other deviations in the time acceptor is possible if only a single "closed controlled system" is obtained instead of a "cascaded control system", i.e., control is effected using the compensation factors (RCF, OCF) and a succession of time markers (Follow-up frames) over the entire system and not over individual subsystems and application gateways (boundary clocks).

The advantages of the arrangement in accordance with the invention, i.e., the shortening of the conversion time by virtue of a short "bridge delay" instead of the cycle period of the "boundary clock" and the avoidance of cascaded control, become even greater when more networks having different communication protocols and different protocols for the time markers are traversed between the time generator and the time receiver. It is therefore advantageous to provide a further device in accordance with the invention for interchanging the time markers and the correction messages between the second and at least one third network. Alternatively, or in addition, the or each device may advantageously comprise a first correction device for measuring and taking into account the conversion delay (i.e., bridge delay) during receipt and evaluation of the first time marker, and during generating and sending the data packet used as a second time marker. In one alternative embodiment, the period of time that is required for converting the time markers of the first protocol into time markers of the second protocol can be measured in a "one-off" calibration operation and taken into account as a constant for propagation time correction of the time markers or adjustment of the content of the "Delay" data field of the time markers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Advantageous refinements of the method according to the invention are explained below with reference to the drawings.

They are simultaneously used for explaining methods according to the invention. This can also involve features from different advantageous refinements being combined with one another.

DETAILED DESCRIPTION OF THE PREFERRED EMBODIMENTS

Figure 1:
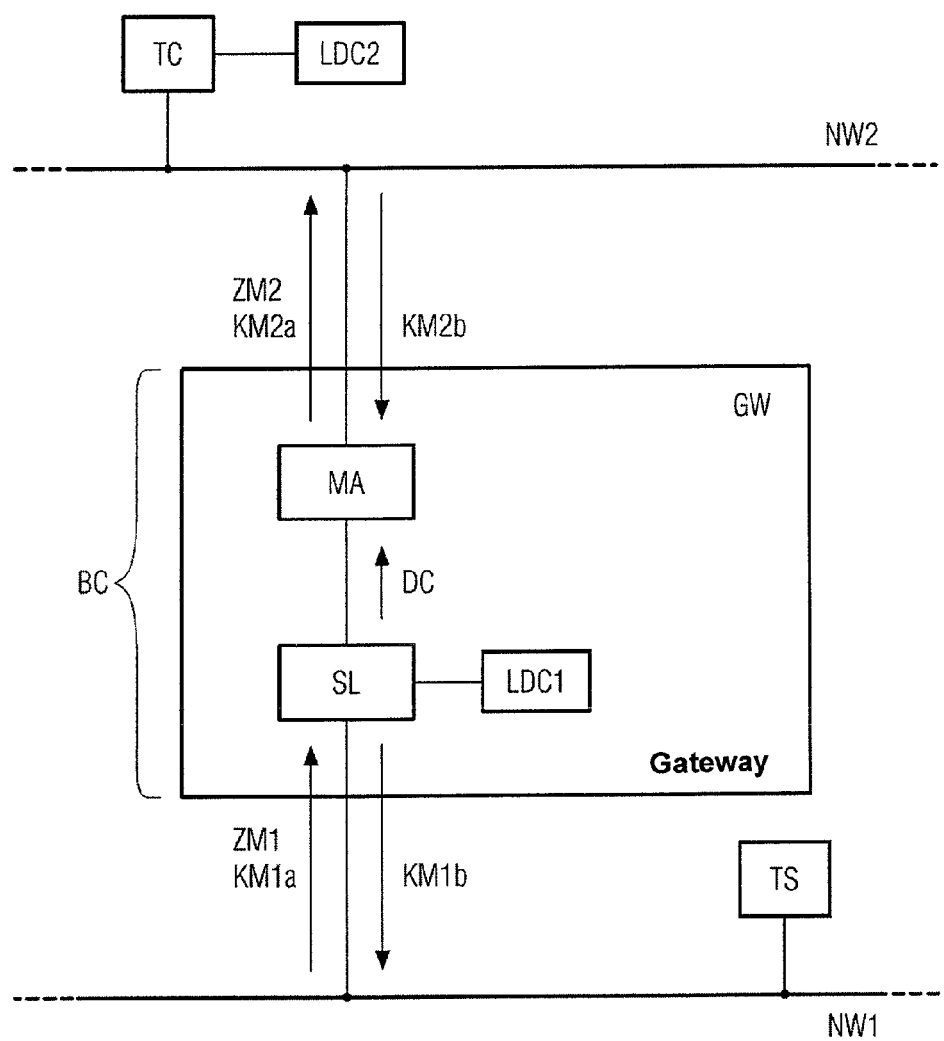
FIG. 1 shows a conventional arrangement having two networks and a time generator and a time receiver, where a "boundary clock" is used for forwarding the time information in a gateway between the two networks.

FIG. 1 shows a conventional arrangement in which a first network NW1 contains a time generator time message server (TS) and a second network NW2 contains a time receiver time message client (TC). The two networks NW1, NW2 differ both in terms of their network protocols and in terms of their protocols for time markers. Therefore, the networks NW1, NW2 are connected to one another by a gateway GW, which basically ensures that messages, i.e., data packets, are interchanged. However, the text below discusses only those devices of the gateway GW that are important for time markers or time synchronization. For this purpose, the gateway has a "boundary clock", which essentially comprises a time receiver SyncSlave (SL) and a time generator SyncMaster (MA). In addition, the time acceptors SL, TC are equipped with correction devices (i.e., Line Delay Compensation (LDC1, LDC2)) for ascertaining the respective signal propagation times and, like every node involved, with compensation (not shown) for taking into account the respective "residence time" of the time marker in the respective node. These "residence times" and propagation times are accumulated in a "Delay" data field of the time markers and are taken into account in the respective time receiver SL, TC.

Here, the conventional arrangement is in a form such that it performs synchronization between the time generator TS and the time receiver SL using the time marker ZM1, where the correction device LDC1 and the correction messages KM1a, KM1b are used to take into account the propagation time delay in the network NW1. The time receiver SL decodes the coded time information transmitted in the time markers ZM1 and transmits the decoded time information DC to the time generator MA, which then synchronizes the time receiver TC with a new time marker ZM2, with a freshly coded time information item being transmitted to the time receiver TC using the network NW2. The propagation time delay in the network NW2 is ascertained by the correction messages KM2a, KM2b and the correction device LDC2, and is likewise taken into account. Moreover, the conventional arrangement shown in FIG. 1 may involve the performance of correction (not shown) of deviations within the "boundary clock", for example, by ascertaining the "delay" that occurs in this case by measuring the time at which the time marker ZM1 is received by the time receiver SL and the time at which the time marker ZM2 is created. Here, the time difference from the measured values is used to correct the time information in the time marker ZM2. This "delay" is also added in the "Delay" data field of the time markers. Furthermore, the "time generator" MA of the "boundary clock" is tracked to the "time acceptor" SL using controller factors (RCF, OCF) ascertained within the "boundary clock" BC.

Figure 2:
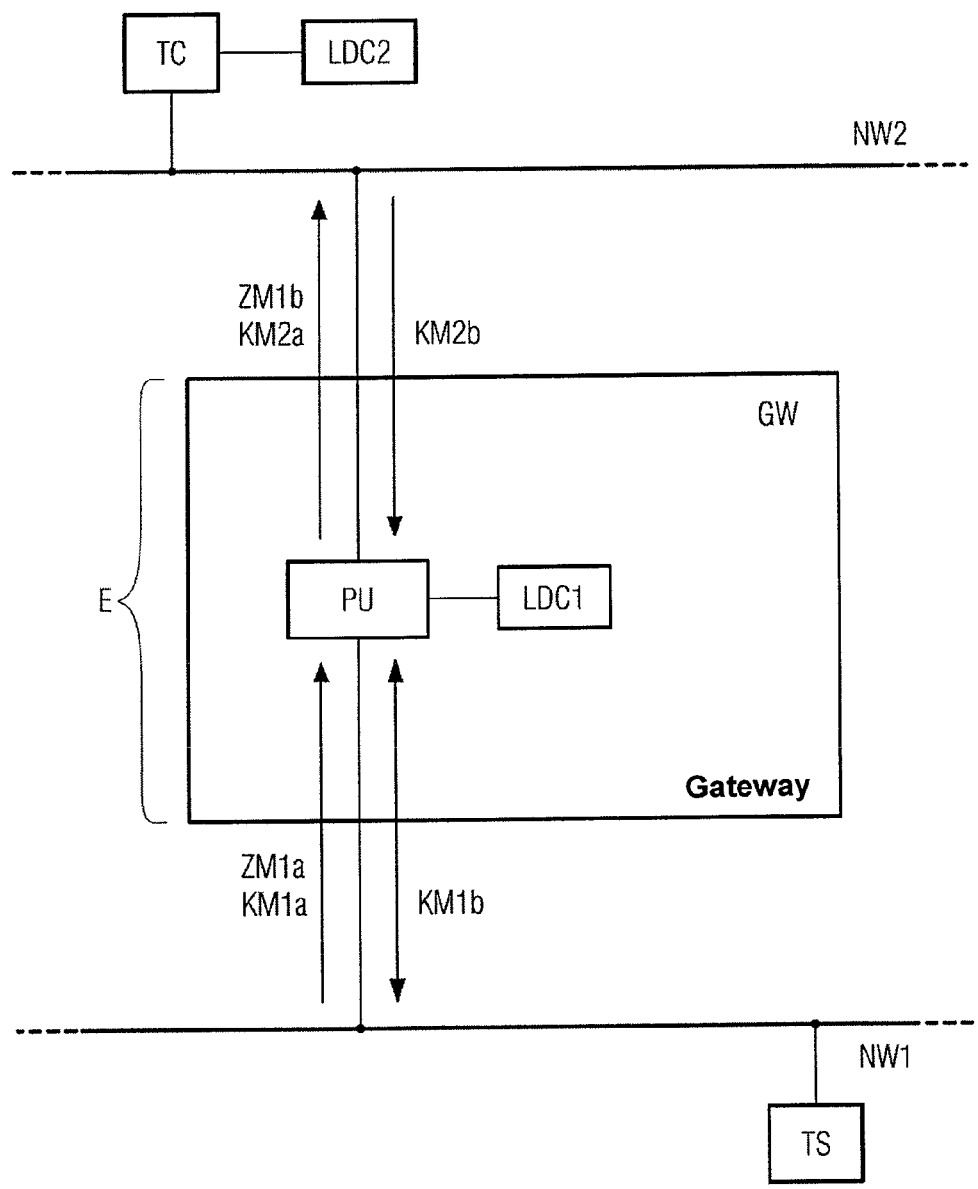
FIG. 2 shows an arrangement with two networks, a time generator and a time receiver, where a device in accordance with the invention is provided for converting the time markers.

FIG. 2 is a schematic block diagram of an arrangement in accordance with the invention for synchronizing the time receiver TC to the time generator TS, those devices and components already introduced with FIG. 1 which have identical reference signs not being re-described. In the gateway GW, instead of a boundary clock BC a device PU (protocol converter) is now used. In accordance with the invention, the device PU receives the time marker ZM1a transmitted by the time generator TS over the network NW1 and converts the time marker ZM1a into a time marker ZM1b in accordance with the protocol that is valid in the network NW2, and transmits it to the time receiver TC. Here, the coded time information contained in the data packet that forms the time marker ZM1a is not decoded but rather, at the outside, is reformatted and transferred directly to the time marker ZM1b. In an alternative embodiment, the data packet that forms the time marker ZM1a can also be sent on as a time marker ZM1b. Here, however, it is necessary to change the transmission protocol specific fields (i.e., the "header") to meet the concerns of the network NW2. Similarly, the content of the "Delay" data field with the hitherto accumulated delay times is transferred from the time marker ZM1a to the time marker ZM1b. In one advantageous embodiment, "bridge delay compensation" can likewise take into account the delay that occurs as because of the conversion of the time marker ZM1a into the time marker ZM1b. This delay is added to the "Delay" data field. Here, it is possible to make use of the fact that, in contrast to the conventional arrangement shown in FIG. 1, there are not two asynchronously operating applications used, i.e., the time receiver SL and the time generator MA, but rather only a single application, i.e., the device PU. The advantage provided by the presently contemplated embodiment is that when a single application is used the conversion delay turns out to be relatively short and constant and can therefore, in one alternative embodiment, be measured and calculated in a "one-off" operation (i.e., a "calibration").

In a further alternative embodiment of the invention, in contrast to the conventional arrangement shown in FIG. 2, the correction message KM1a, which is transmitted over the network NW1 by the time generator TS to ascertain the propagation time (line delay), is converted by the device PU, likewise as a correction message KM2a, into a protocol-compliant data packet of the network NW2 and forwarded to the time receiver TC. The "response", i.e., the correction message KM2b, is likewise "forwarded" by the device PU and transmitted to the time generator TS as the correction message KM1b. As a result, it is possible to take into account the total propagation time delay of the time marker ZM1a, ZM1b, including the conversion delays (bridge delay), in a single correction operation.

Figure 3:
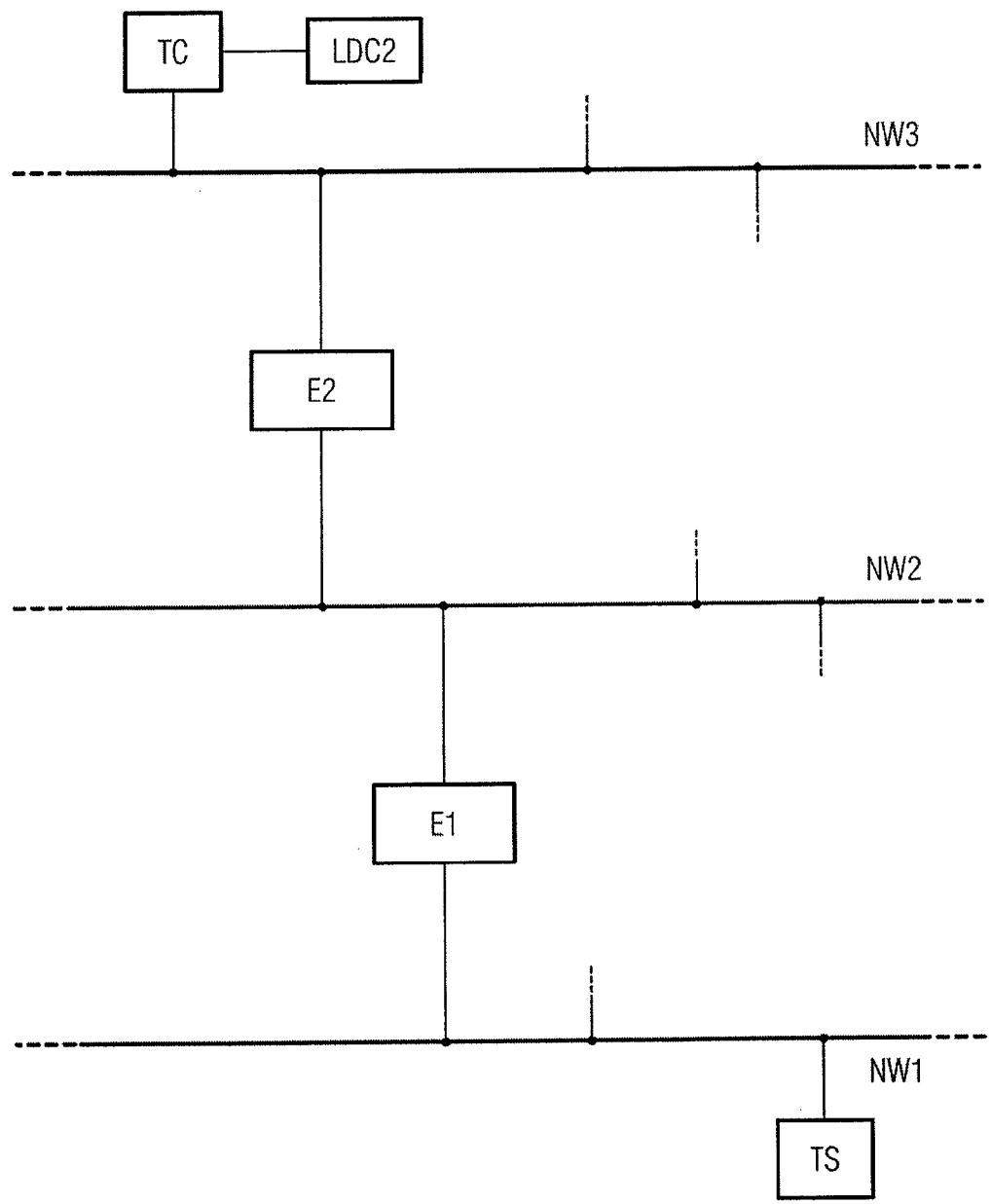
FIG. 3 shows an arrangement with a plurality of devices in accordance with the invention for converting the time markers, where the time markers traverse three networks.

The advantages of the method in accordance with the invention and of the use of devices in according to the invention becomes clear, particularly for such arrangements as shown in FIG. 3, when a multiplicity of networks NW1, NW2, NW3 are interconnected and a plurality of devices E1, E2 need to be transited in succession by a time marker. Here, a single adjustment of a clock rate for the time receiver TC suffices, as a result of which cascaded control of a plurality of "receiver clocks" using factors (RCF, OCF) is not necessary. In addition, the arrangement shown in FIG. 3 is already a simplified in comparison to conventional arrangements, because in actual arrangements it is entirely possible for situations to arise in which networks in two or three figures need to be traversed.

Figure 4:
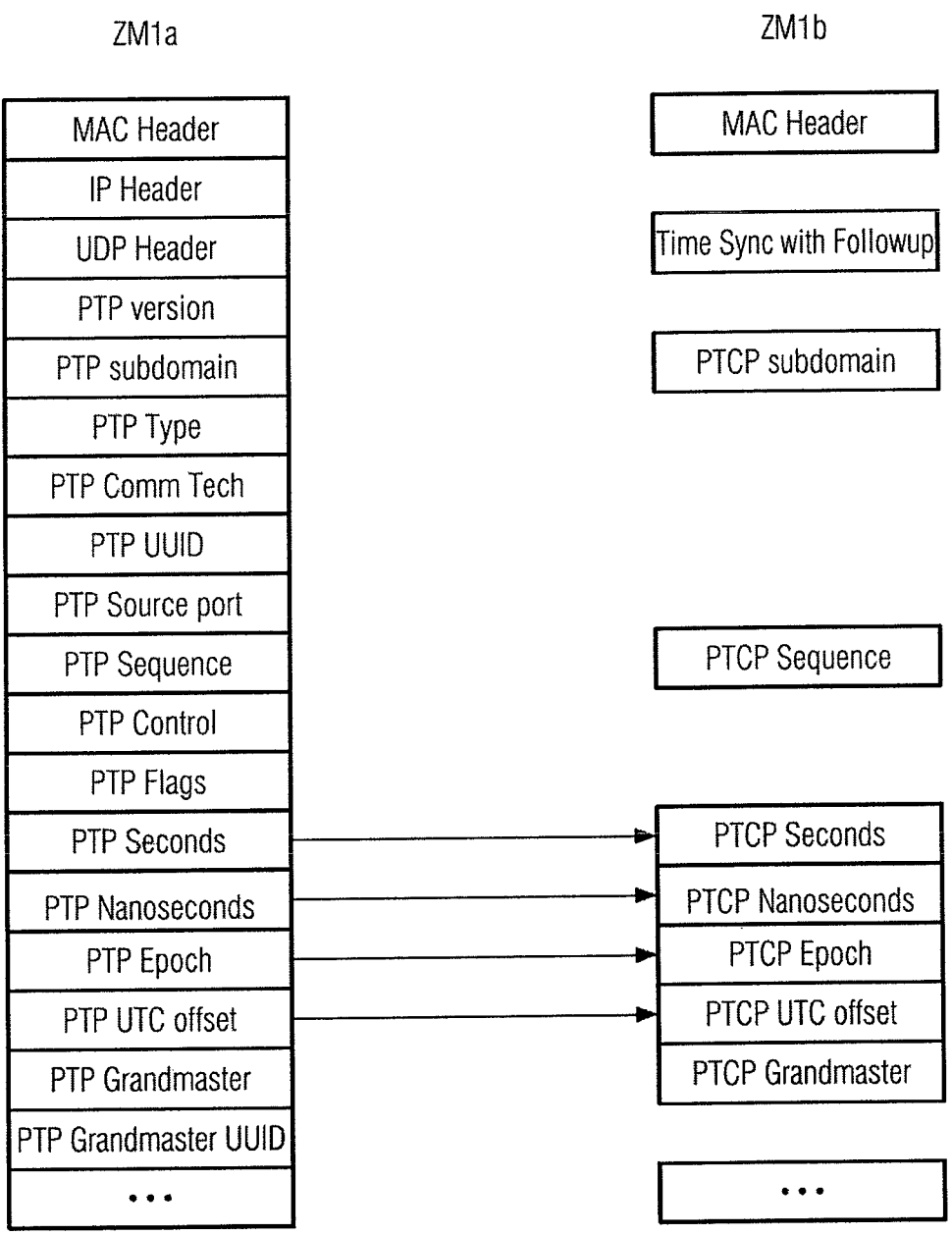
FIG. 4 shows a schematic illustration of the structural design of time markers in accordance with two different protocols, where the transfer of data fields with the coded time information from a first time marker to a second time marker is shown.

FIG. 4 shows two exemplary time markers ZM1a, ZM1b, the time marker ZM1a being coded based on the PTP protocol and being able to be used in Ethernet networks with the TCP/IP protocol, whereas the time marker ZM1b is coded in accordance with the PTCP protocol and can be used in automation networks with the Profinet protocol, for example. Here, both time markers ZM1a, ZM1b are shown in simplified form and detailed form. Here, it can be seen that the time information is coded in a plurality of data fields, such as seconds, nanoseconds, epochs or. In addition, it can be seen that the coded time information has the same structure for both protocols. At the outside, there are formal differences, such as the length of the data fields, between the two protocols. From this, it can be seen that interim decoding and recoding of the time information is not necessary. That is, the contents of the data fields can be converted in almost unaltered form from one protocol to the other protocol. A similar situation applies to the information (not shown) about the propagation time, i.e., the "Delay" data field. In accordance with the invention, those data fields that are not "compatible" or which, although present in the protocol to be converted, are not present in the converted protocol, for example, can be filled with standard values (i.e., default values) which, by way of example, can be projected, can be ascertained by an evaluation program or else can be requested by a user using a "one-off" query.

While the disclosed exemplary embodiments have been used to describe only unidirectional transmissions of time markers, it should be appreciated that the contemplated devices can also be used for the bi-directional interchange of time markers. Rather than non-protocol-compliant time markers or time markers (packed in "data containers") from other communication and time protocols, for example, only protocol-compliant time markers are used in each of the individual networks under consideration. As a result, the other network elements, i.e., routers, switches and other active components, used in the networks under consideration do not need to be adjusted. In addition, there is a significant advantage provided in that the time generators TS and time receivers TC, for example, the known PTCP appliances, do not need to be changed in comparison with the convention appliances for application of the method or for interaction with the device in accordance with the invention.

Figure 5:
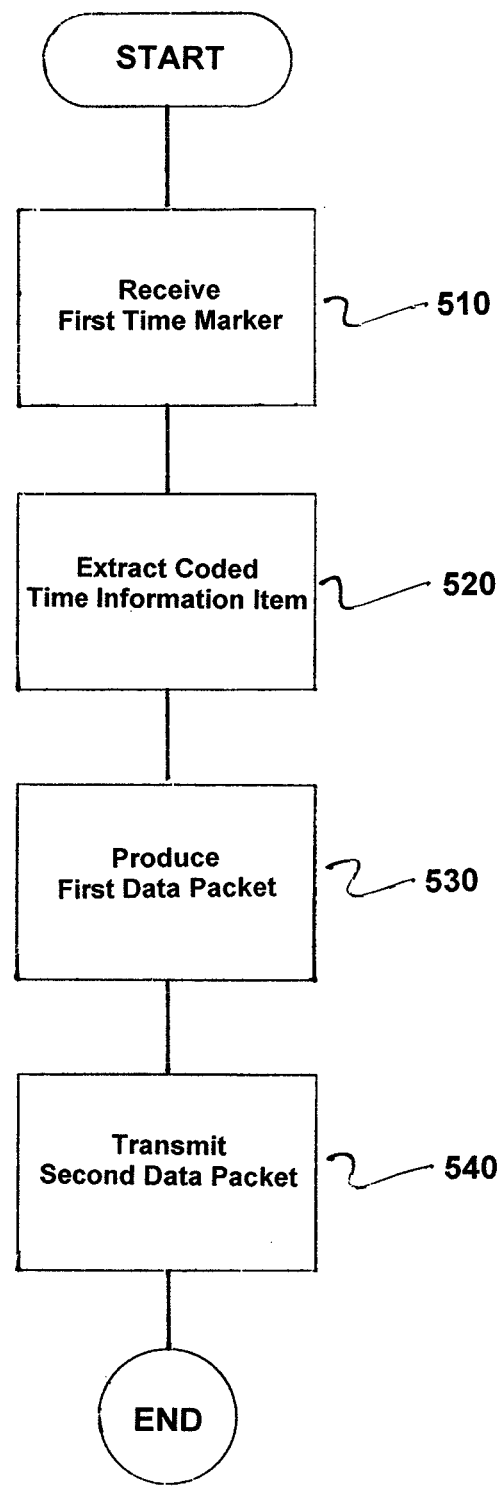
FIG. 5 is a flow chart of a method in accordance with an embodiment of the invention.

FIG. 5 is a flow chart of a method for interchanging time markers ZM1a, ZM1b between a first and a second network NW2. The method comprises receiving a first time marker ZM1a from a time generator TS over a first network NW1, as indicated in step 510. A coded time information item is extracted from the received data packet, as indicated in step 520.

A first data packet is produced based on a second protocol, as indicated in step 530. Here, a payload added to the data packet comprises the coded time information item that is extracted from the first data packet. A second data packet is transmitted to at least one time receiver TC as a second time marker ZM1b over the second network NW2, as indicated in step 540.

In accordance with the method of the invention, the first network NW1 utilizes a first protocol and the second network NW2 utilizes a different second protocol for the time markers ZM1a, ZM1b, and the time markers ZM1a, ZM1b each have data packets having a payload comprising the coded time information item.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement including a gateway, a time generator in a first network, and a time receiver in a second network arranged in a closed loop system, the gateway for interchanging time markers between the time generator and the time receiver, wherein the first network includes a first protocol and the second network includes a different second protocol for the time markers;

wherein the time markers each comprise data packets having a payload comprising a coded time information item;

wherein the gateway receives a first time marker over the first network, directly extracts the coded time information item from the first time marker, inserts the coded time information item into a new data packet of the second protocol producing the new data set, and transmits the new data packet as a second time marker over the second network and over an entire path of the closed-loop system comprising the gateway, the time generator in the first network, and the time receiver in the second network;

wherein the time markers are interchanged over the second and a third network having a time receiver by repeatedly receiving, extracting, producing, and transmitting by a further device between the second network and the third network;

wherein an accumulated propagation time delay in repeatedly converted time markers is taken into account in the time receiver of the third network; and wherein generation of the second data packet takes into account a conversion delay by adding the time required for the conversion of the coded time information from the first data packet to the second data packet to a value in a data field for propagation time delays in the second time marker.

2. The arrangement as claimed in patent claim 1, further comprising: at least one further gateway for interchanging the time markers between the second and the third network.

3. The arrangement as claimed in patent claim 1, wherein the gateway comprises a first correction device for capturing a propagation time of a time marker in the first network.

4. A method for interchanging time markers between at least a first and a second network arranged in a closed-loop system, wherein the first network utilizes a first protocol and the second network utilizes a different second protocol for the time markers, the method comprising:

receiving, at a gateway, a first time marker from a time generator over the first network of the closed-loop system, the first time marker having a first data packet with a payload comprising a coded time information item;

extracting, by the gateway, the coded time information item from the received first data packet;

producing a second data packet based on the second protocol, wherein the coded time information item extracted from the first data packet is added to the second data packet as a payload of the second data packet;

transmitting the second data packet with the payload to at least one time receiver as a second time marker over the second network and over an entire path of the closed-loop system comprising the gateway, the time generator in the first network, and the time receiver in the second network; and interchanging time markers over the second and a third network having a time receiver by repeating the steps of receiving, extracting, producing, and transmitting by a further device between the second network and the third network, wherein an accumulated propagation time delay in repeatedly converted time markers is taken into account in the time receiver of the third network; and wherein generation of the second data packet takes into account a conversion delay by adding the time required for the conversion of the coded time information from the first data packet to the second data packet to a value in a data field for propagation time delays in the second time marker.

5. The method as claimed in patent claim 4, wherein generation of the second data packet takes into account a conversion delay by adding the time required for the conversion of the coded time information from the first data packet to the second data packet to a value in a data field for propagation time delays in the second time marker.

\* \* \* \* \*